United States Patent
Ito

(10) Patent No.: US 6,647,153 B1
(45) Date of Patent: Nov. 11, 2003

(54) METHOD, APPARATUS, AND RECORDING MEDIUM FOR IMAGE COMPOSITION

(75) Inventor: Wataru Ito, Kaisei-machi (JP)

(73) Assignee: Fuji Photo Film Co., Ltd., Kanagawa-ken (JP)

(*) Notice: Subject to any disclaimer, the term of this patent is extended or adjusted under 35 U.S.C. 154(b) by 0 days.

(21) Appl. No.: 09/517,075

(22) Filed: Mar. 1, 2000

(30) Foreign Application Priority Data

Mar. 1, 1999 (JP) .......................................... 11-052096

(51) Int. Cl.[7] .................................................. G06K 9/36
(52) U.S. Cl. ........................................ 382/284; 358/450
(58) Field of Search ................................ 382/282, 283, 382/284, 167, 274, 209, 295; 358/443, 450, 452; 345/630

(56) References Cited

U.S. PATENT DOCUMENTS 5,202,935 A * 4/1993 Kanamori et al. .............. 382/54
5,982,951 A * 11/1999 Katayama et al. .......... 382/284
6,282,330 B1 * 8/2001 Yokota et al. .............. 382/309

FOREIGN PATENT DOCUMENTS

JP          9114853        5/1997
JP          10124693       5/1998

* cited by examiner

Primary Examiner—Yon J. Couso
(74) Attorney, Agent, or Firm—Birch, Stewart, Kolasch & Birch, LLP

(57) ABSTRACT

A template is combined with an image in a well-balanced manner. Order information including the name of a user's photograph and a template used for image composition is read from a recording medium. Image processing means reads template data and accompanying information representing an impression of the template by using a sensation expression, based on the order information. The image processing means obtains processed image data by carrying out image processing according to the sensation expression on image data based on the accompanying information. Composition means composes the template data with the processed image data, and obtains composite image data. Output means prints the composite image data.

12 Claims, 5 Drawing Sheets

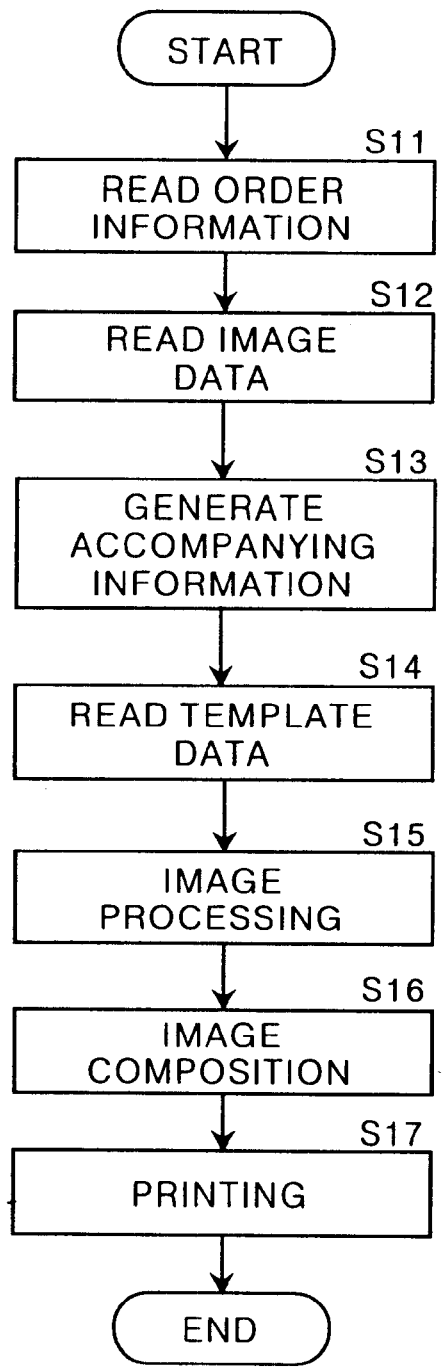

METHOD, APPARATUS, AND RECORDING MEDIUM FOR IMAGE COMPOSITION

BACKGROUND OF THE INVENTION

1. Field of the Invention

The present invention relates to an image composition method and an image composition apparatus for combining an image with a template, and also to a computer-readable recording medium storing a program to cause a computer to execute the image composition method.

2. Description of the Related Art

A service for generating a picture postcard for a new year's greeting and the like by using a template comprising characters or an illustration for greeting and a blank space for inserting a photograph has been available. Such a postcard is generated from a user's original photograph recorded on a negative film or the like and brought in to a DPE shop by the user. At the DPE shop, the original image is converted into digital image data and composite image data are obtained by composing the digital image data with template data representing a template or indicating a character position. The postcard is generated by printing a composite image based on the composite image data. For generating such postcards, a method of finishing a composite image having a well-balanced image and template by setting the brightness of both the image and the template to 18%, which is a standard reflection ratio, has been proposed (see Japanese Unexamined Patent Publication No. 10(1998)-124693, for example).

Meanwhile, an image can be expressed by using a sensation expression such as "vivid", "modest", and "calm". In order to search for an image corresponding to a sensation expression desired by a user among a plurality of images, a search apparatus has been proposed (Japanese Unexamined Patent Publication No. 9(1997)-114853). In this search apparatus, the images as well as characteristic values related to the images and representing the content of processing based on sensation expressions regarding the images are stored, and the desired image is searched for by calculating the characteristic value corresponding to the sensation expression used by the user.

Since respective images and templates used for image composition give different impressions, a composite image comprising an image and a template both giving different impressions becomes unharmonious if the processing for equalizing the brightness of the image and the template has been carried out as has been described in Japanese Unexamined Patent Publication No. 10(1998)-124693. In this case, it is possible to generate a composite image by relating templates with sensation expressions and by searching for a template corresponding to an impression of an image, as has been described in Japanese Unexamined Patent Publication No. 9(1997)-114853. However, since the number of templates is limited, a template corresponding to the impression of the image may not necessarily be a desired template.

SUMMARY OF THE INVENTION

The present invention has been conceived based on consideration of the above problems. An object of the present invention is to provide an image composition method and an image composition apparatus for combining an image with a desired template in a favorable balance in terms of impression, and also a computer-readable recording medium storing a program to cause a computer to execute the image composition method.

A first image composition method of the present invention is a method of obtaining composite image data by composing template data representing a template with image data representing an image, and the first method comprises the steps of:

reading the template data and accompanying information representing an impression of the template from storing means storing the template data and the accompanying information;

obtaining processed image data by carrying out image processing on the image data according to the accompanying information; and obtaining the composite image data by composing the template data with the processed image data.

A second image composition method of the present invention is a method of obtaining composite image data by composing template data representing a template with image data representing an image, and the second method comprises the steps of:

reading the template data from storing means storing the template data;

generating accompanying information in accordance with an impression of the image, based on the image data;

obtaining processed template data by carrying out image processing on the template data according to the accompanying information; and obtaining the composite image data by composing the processed template data with the image data.

The "accompanying information" herein referred to means information representing an impression of a template or an image. The accompanying information may be information expressed by using a sensation expression such as "light", "modest", "summer-like", or "calm", or information indicating the content of image processing expressed by a sensation expression. The content of image processing and the sensation expression may be related experimentally or statistically in advance. Furthermore, as has been described in Japanese Unexamined Patent Publication No. 9(1997)-114853, a physical characteristic value such as thickness of lines, contrast, a straight-line ratio, an orthogonal-component ratio, a black-area ratio, and a degree of symmetry around a vertical axis may be found by carrying out an operation for extracting a characteristic on the template data or on the image data. According to a relationship between this characteristic value and a sensational characteristic value found in advance, the sensational characteristic value is determined as the sensation expression.

A first image composition apparatus of the present invention is an image composition apparatus for obtaining composite image data by composing template data representing a template with image data representing an image, and the first image composition apparatus comprises:

storing means for storing the template data with accompanying information expressing an impression of the template;

reading means for reading the template data and the accompanying information from the storing means;

image processing means for obtaining processed image data by carrying out image processing on the image data according to the accompanying information; and composition means for obtaining the composite image data by composing the template data with the processed image data.

A second image composition apparatus of the present invention is an image composition apparatus for obtaining composite image data by composing template data representing a template with image data representing an image, and the second image composition apparatus comprises:

storing means for storing the template data;

reading means for reading the template data from the storing means;

generating means for generating accompanying information in accordance with an impression of the image, based on the image data;

image processing means for obtaining processed template data by carrying out image processing on the template data according to the accompanying information; and composition means for obtaining the composite image data by composing the processed template data with the image data.

The image composition methods of the present invention may be provided as a computer-readable recording medium storing a program to cause a computer to execute the image composition methods.

According to the first image composition method and the first image composition apparatus of the present invention, the processed image data are obtained by carrying out image processing on the image data used for image composition according to the accompanying information representing the impression of the template used for image composition, and the composite image data are obtained by composing the processed image data with the template data.

Meanwhile, according to the second image composition method and the second image composition apparatus of the present invention, the processed template data are obtained by carrying out image processing on the template data used for image composition according to the accompanying information representing the impression of the image data used for image composition, and the composite image data are obtained by composing the processed template data with the image data.

Therefore, in a composite image obtained by reproducing the composite image data, the image and the template are well balanced in terms of impression. In this manner, the composite image giving a preferable impression can be obtained.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 5 is a flow chart showing an operation of the second embodiment.

DESCRIPTION OF THE PREFERRED EMBODIMENTS

Hereinafter, embodiments of the present invention will be explained with reference to the accompanying drawings.

Figure 1:
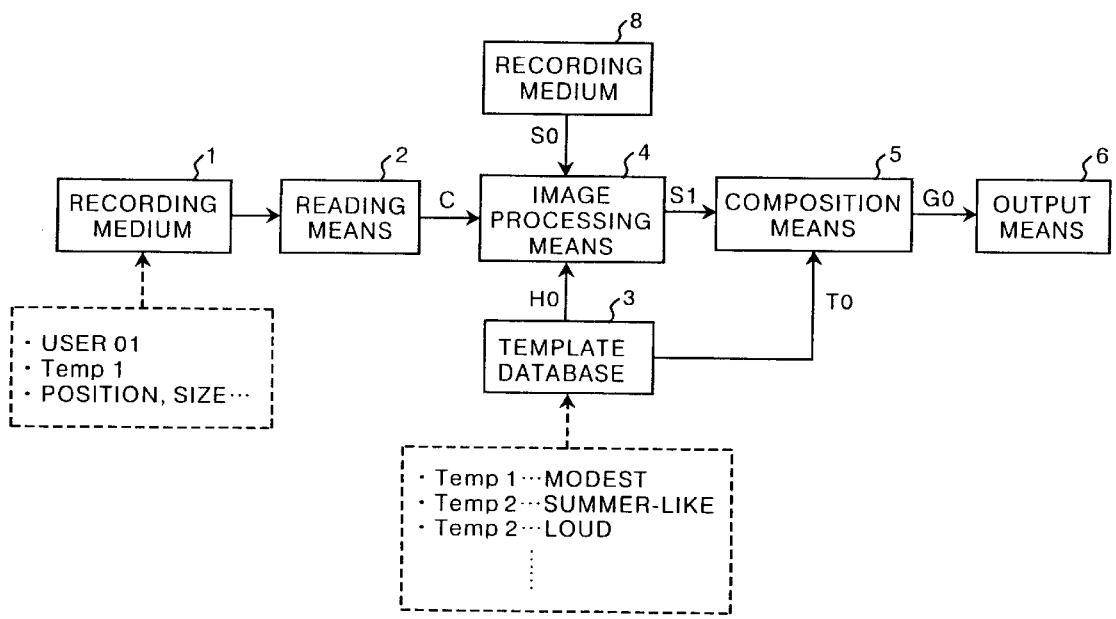
FIG. 1 is a block diagram showing an outline configuration of an image composition apparatus according to a first embodiment of the present invention.

FIG. 1 is a block diagram showing an outline configuration of an image composition apparatus according to a first embodiment of the present invention. As shown in FIG. 1, the image composition apparatus according to the first embodiment is to combine an image of a user with a template. The image composition apparatus comprises reading means 2 for reading order information C from a recording medium 1 storing the order information C, such as a ZIP disc, an MO disc, a CD-R, and an FD, a template database 3 storing a plurality of template data sets T0 representing templates and accompanying information H0 according to sensation expressions each related to an impression of each of the templates, image processing means 4 for reading one of the template data sets T0 from the template database 3 according to the order information C and for obtaining processed image data S1 by carrying out image processing on image data S0 representing the user's image used for image composition according to the accompanying information H0 of the template data T0 set having been read, composition means 5 for obtaining composite image data G0 by composing the processed image data S1 with the template data set T0, and output means 6 for printing the composite image data G0. The image data S0 used for image composition have been stored in a large-capacity recording medium 8 such as a hard disc after reading the image from a film or the like.

The order information C recorded in the recording medium 1 includes the name of the user's photograph (USER01) to be used for image composition, the number of a template to be used for image composition (Temp01), a position of inserting the user's photograph, and the size of the photograph, for example.

The template database 3 stores template data sets T0 (Temp01, Temp02, Temp03, and so on) accompanied by the information H0 according to a sensation expression representing an impression of each of templates represented by each of the template data sets T0. For example, the accompanying information H0 according to sensation expressions such as "modest", "summer-like", and "loud" is added to templates Temp01, Temp02, and Temp03, respectively. The impressions judged by a viewer of the templates may be expressed as the sensation expressions and added to the templates as the accompanying information H0 thereof. Alternatively, as has been described in Japanese Unexamined Patent Publication No. 9(1997)-114853, physical characteristic values such as thickness of lines included in each template, contrast, a straight-line ratio, an orthogonal-component ratio, a black-area ratio, and a degree of symmetry around a vertical axis may be found by carrying out an operation for extracting a characteristic on the template data, so that a sensational characteristic value can be found as the sensation expression to be added to the template as the accompanying information H0 by using a pre-found relationship between the physical characteristic value and the sensational characteristic value.

The image processing means 4 reads the image data S0 to be used for image composition from the recording medium 8 according to the order information C, and obtains the processed image data S1 by carrying out image processing on the image data S0 according to the accompanying information H0 of the template data set T0 to be used for image composition. More specifically, when the content of the accompanying information H0 is "light", processing for improving saturation and hard tone processing is carried out to create a light impression, for example. When the content of the accompanying information is "modest", saturation suppressing processing and soft tone processing is carried out to create a modest impression. In the case where the accompanying information is "summer-like", processing for improving saturation of blue and sharpness enhancing processing is carried out to create a summer-like impression. If the accompanying information is "calm", processing for decreasing luminance of high saturation colors is carried out to create a calm impression. The content of the image processing is assumed to have been related to the accompanying information H0 in advance in an experimental or statistical manner.

Figure 2:
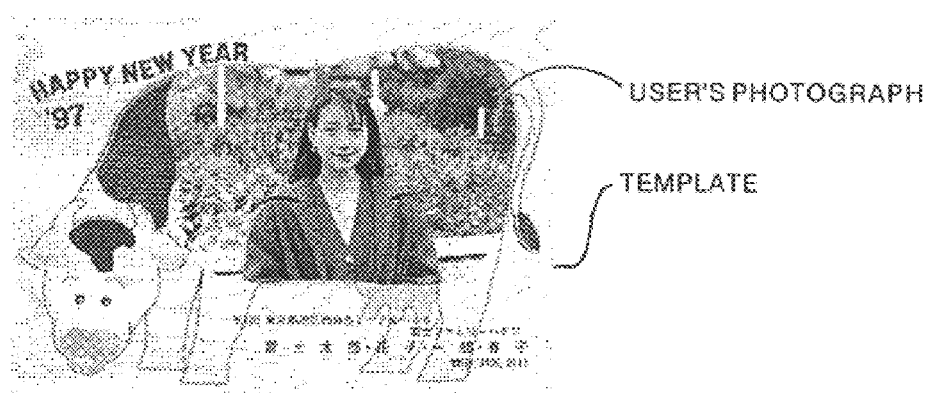
FIG. 2 is a composite image.

The composition means 5 obtains the composite image data G0 as shown in FIG. 2 by composing the processed image data S1 obtained by the image processing means 4 with the template data set T0.

Figure 3:
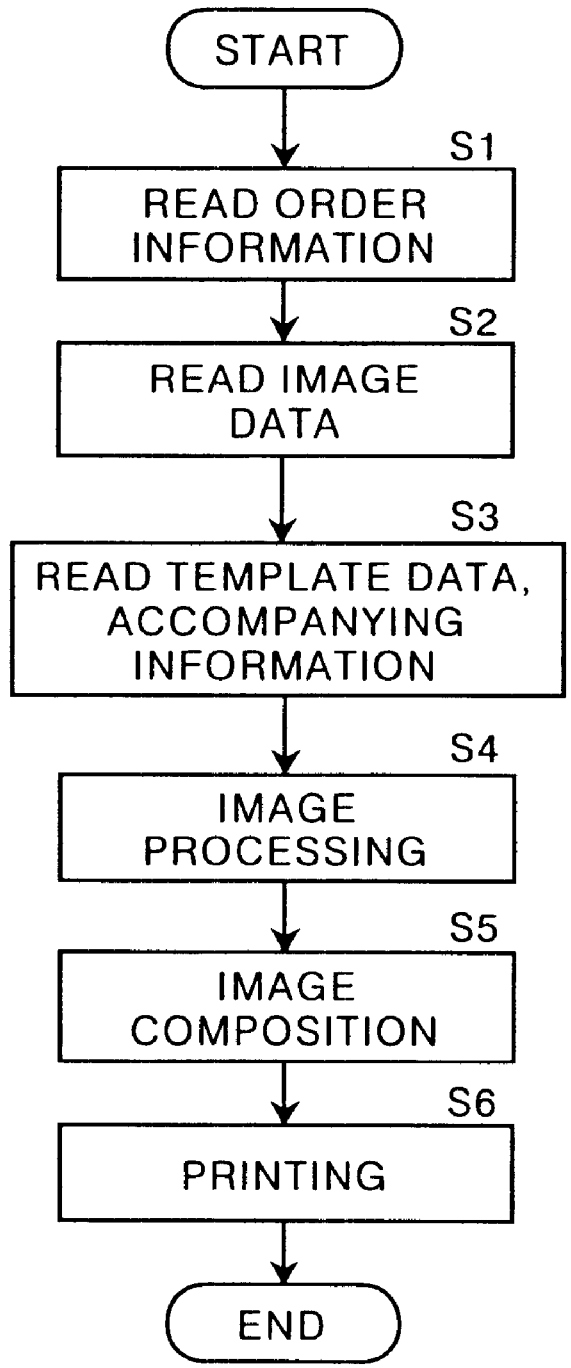
FIG. 3 is a flow chart showing an operation of the first embodiment.

An operation of the first embodiment will be explained next. FIG. 3 is a flow chart showing the operation of the first embodiment. The order information C is read from the recording medium 1 (Step S1). The image processing means 4 reads the image data S0 from the recording medium 8 according to the order information C (Step S2), and reads the template data set T0 to be used for image composition and its accompanying information H0 from the template database 3 (Step S3). The image processing means 4 obtains the processed image data S1 by carrying out image processing on the image data S0 according to the accompanying information H0 (Step S4). The template data set T0 having been read are input to the composition means 5. The composition means 5 obtains the composite image data G0 by composing the processed image data S1 with the template data set T0 (Step S5), and the output means 6 prints the composite image data G0 (Step S6) to complete the processing.

As has been described above, in the first embodiment, the processed image data S1 are obtained by carrying out image processing on the image data S0 used for image composition, according to the accompanying information H0 representing the impression of the template to be used for image composition. The composite image data G0 are obtained by composing the processed image data S1 with the template data set T0. Therefore, in the composite image obtained by reproduction of the composite image data G0, the template and the user's image are well balanced. In this manner, a composite image giving a preferable impression can be obtained.

In the first embodiment described above, the accompanying information H0 according to a sensation expression is added to the template data set T0. However, the content of image processing in response to the sensation expression may be attached to the template data T0 as the accompanying information H0 thereof. In this case, the image processing means 4 carries out image processing expressed by the accompanying information H0 having been read on the image data S0.

Furthermore, in the first embodiment described above, one image is combined with one template. However, a plurality of images may be combined with one template. In this case, image processing according to the accompanying information H0 representing an impression of the template is carried out on each set of image data representing each image to be combined together, and the processed image data sets are composed with the template data set T0 to obtain the composite image data G0.

Figure 4:
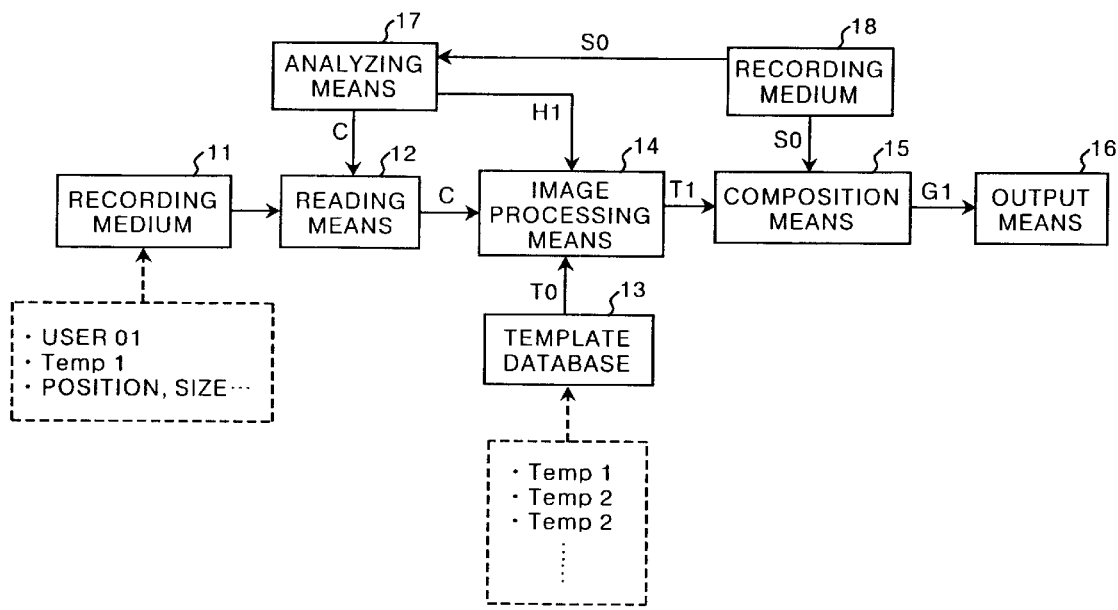
FIG. 4 is a block diagram showing an outline configuration of an image composition apparatus according to a second embodiment of the present invention.

A second embodiment of the present invention will be explained next. FIG. 4 is a block diagram showing an outline configuration of an image composition apparatus according to the second embodiment. As shown in FIG. 4, the image composition apparatus according to the second embodiment comprises reading means 12 for reading order information C from a recording medium 11, a template database storing a plurality of template data sets T0 representing templates, analyzing means 17 for reading image data S0 from a recording medium 18 such as a hard disc based on an item of the order information C indicating a photograph of a user and for generating accompanying information H1 representing an impression of the user's photograph by analyzing the photograph represented by the image data S0, image processing means 14 for reading one of the template data sets T0 from the template database 13 according to the order information C and for obtaining processed template data T1 by carrying out image processing on the template data set T0 based on the accompanying information H1 generated by the analyzing means 17, composition means 15 for obtaining composite image data G1 by composing the processed template data T1 with the image data S0, and output means 16 for printing the composite image data G1.

As has been described in Japanese Unexamined Patent Publication No. 9(1997)-114853, the analyzing means 17 finds physical characteristic values such as thickness of lines in the user's photograph, contrast, a straight-line ratio, an orthogonal-component ratio, a black-area ratio, and a degree of symmetry around a vertical axis, by carrying out an operation for extracting a characteristic on the image data S0, so that a sensational characteristic value can be found as the sensation expression generated as the accompanying information H1 by using a pre-found relationship between the physical characteristic value and the sensational characteristic value. Alternatively, an impression judged by a viewer of the photograph may be expressed by using a sensation expression and generated as the accompanying information H1.

The image processing means 14 carries out image processing on the template data set T0, based on the accompanying information H1 generated by the analyzing means 17. The accompanying information H1 and the content of the image processing are the same as the accompanying information and the content of the image processing in the image processing means 4 of the first embodiment, and detailed explanation thereof is omitted here.

An operation of the second embodiment will be explained next. FIG. 5 is a flow chart showing the operation of the second embodiment. The order information C is read from the recording medium 11 (Step S11), and the analyzing means 17 reads the image data S0 from the recording medium 18 according to the order information C (Step S12). The analyzing means 17 analyzes the image data S0 and generates the accompanying information H1 representing an impression of the photograph of the user (Step S13). The image processing means 14 reads the template data set T0 to be used for image composition from the template database 13, based on the order information C (Step S14), and obtains the processed template data T1 by carrying out image processing on the template data set T0 according to the accompanying information H1 (Step S15). The composition means 15 obtains the composite image data G1 by composing the processed template data T1 with the image data S0 (Step S16), and the output means 16 prints the composite image data G1 (Step S17) to complete the processing.

As has been descried above, in the second embodiment, image processing is carried out on the template data T0 to be used for image composition, according to the accompanying information H1 representing the impression of the image data S0 to be combined with the template. The composite image data G1 are generated by composing the processed template data T1 with the image data S0. Therefore, a composite image obtained by reproduction of the composite image data G1 has the template and the user's photograph in a suitable balance. In this manner, the composite image giving a preferable impression can be obtained.

In the second embodiment described above, the accompanying information H1 according to the sensation expression is generated by the analyzing means 17. However, the content of image processing corresponding to the sensation expression may be generated as the accompanying information H1. In this case, the image processing means 14 may carry out the image processing indicated by the accompanying information H1 on the template data set T0.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image composition method for obtaining composite image data by composing template data representing a template with image data representing an image, the image composition method comprising the steps of:

reading the template data and accompanying information representing a visual impression of the template from storing means storing the template data and the accompanying information;

obtaining processed image data by carrying out image processing on the image data according to the accompanying information; and obtaining the composite image data by composing the template data with the processed image data.

2. An image composition method for obtaining composite image data by composing template data representing a template with image data representing an image, the image composition method comprising the steps of:

reading the template data from storing means storing the template data;

generating accompanying information in accordance with a visual impression of the image, based on the image data;

obtaining processed template data by carrying out image processing on the template data according to the accompanying information; and obtaining the composite image data by composing the processed template data with the image data.

3. An image composition apparatus for obtaining composite image data by composing template data representing a template with image data representing an image, the image composition apparatus comprising:

storing means for storing the template data with accompanying information representing a visual impression of the template;

reading means for reading the template data and the accompanying information from the storing means;

image processing means for obtaining processed image data by carrying out image processing on the image data according to the accompanying information; and composition means for obtaining the composite image data by composing the template data with the processed image data.

4. An image composition apparatus for obtaining composite image data by composing template data representing a template with image data representing an image, the image composition apparatus comprising:

storing means for storing the template data;

reading means for reading the template data from the storing means;

generating means for generating accompanying information in accordance with a visual impression of the image, based on the image data;

image processing means for obtaining processed template data by carrying out image processing on the template data according to the accompanying information; and composition means for obtaining the composite image data by composing the processed template data with the image data.

5. A computer-readable recording medium storing a program to cause a computer to execute an image composition method for obtaining composite image data by composing template data representing a template with image data representing an image, the program comprising the procedures of:

reading the template data and accompanying information representing a visual impression of the template from storing means storing the template data and the accompanying information;

obtaining processed image data by carrying out image processing on the image data according to the accompanying information; and obtaining the composite image data by composing the template data with the processed image data.

6. A computer-readable recording medium storing a program to cause a computer to execute an image composition method for obtaining composite image data by composing template data representing a template with image data representing an image, the program comprising the procedures of:

reading the template data from storing means storing the template data;

generating accompanying information in accordance with a visual impression of the image, based on the image data;

obtaining processed template data by carrying out image processing on the template data according to the accompanying information; and obtaining the composite image data by composing the processed template data with the image data.

7. The image composition method according to claim 1, wherein the accompanying information is information expressed by using a sensation expression or information indicating the content of image processing expressed by a sensation expression.

8. The image composition method according to claim 2, wherein the accompanying information is information expressed by using a sensation expression or information indicating the content of image processing expressed by a sensation expression.

9. The image composition apparatus according to the claim 3, wherein the accompanying information is informa tion expressed by using a sensation expression or information indicating the content of image processing expressed by a sensation expression.

10. The image composition apparatus according to the claim 4, wherein the accompanying information is information expressed by using a sensation expression or information indicating the content of image processing expressed by a sensation expression.

11. The computer-readable medium according to claim 5, wherein the accompanying information is information expressed by using a sensation expression or information indicating the content of image processing expressed by a sensation expression.

12. The computer-readable medium according to claim 6, wherein the accompanying information is information expressed by using a sensation expression or information indicating the content of image processing expressed by a sensation expression.

* * * * *